Figure 1:
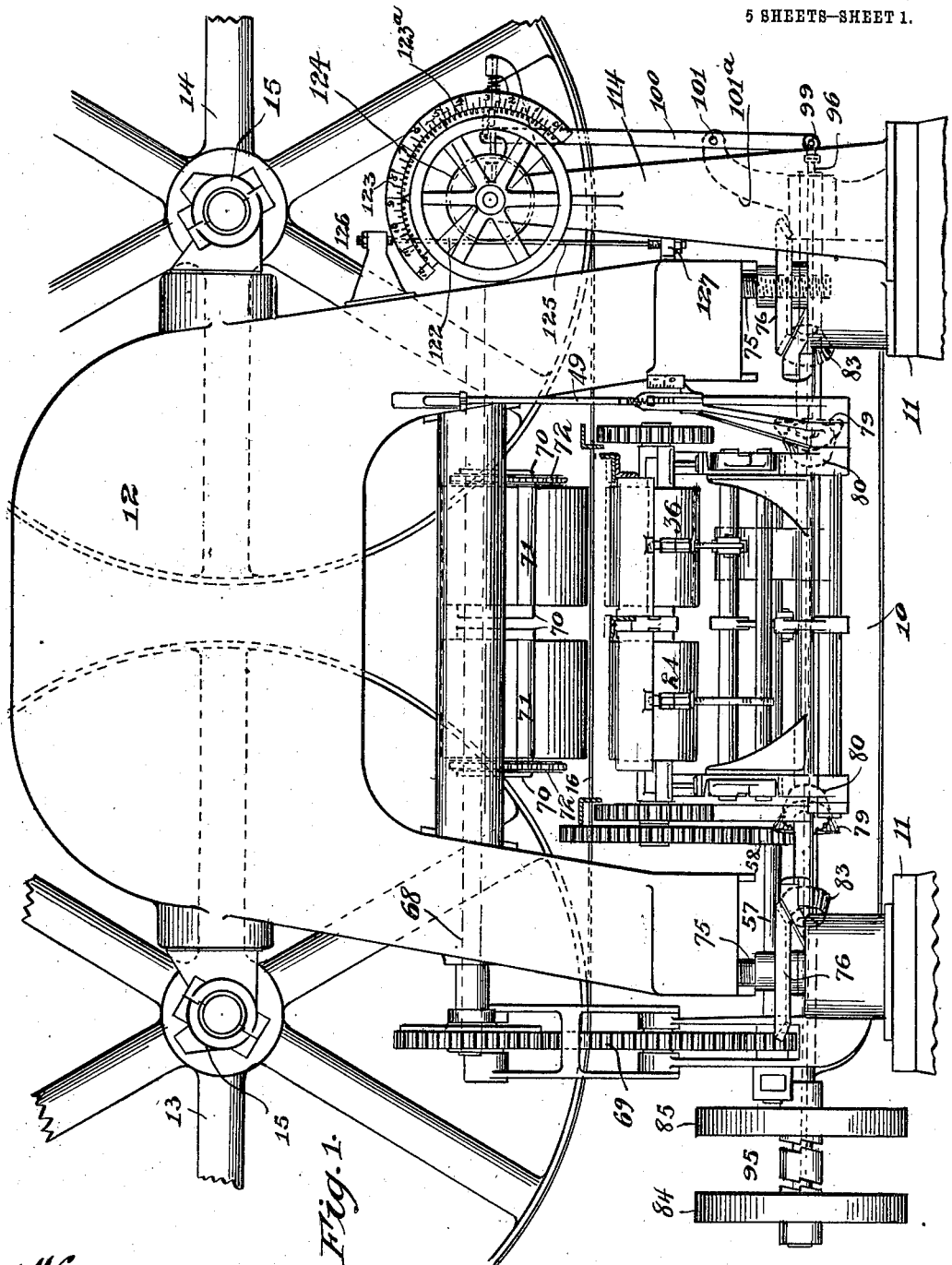

B. D. STEVENS.
ADJUSTING MEANS FOR SAWS.
APPLICATION FILED APR. 15, 1907.

1,001,783.

Patented Aug. 29, 1911.

5 SHEETS—SHEET 1.

Witnesses,
S. S. Mann
Walter M. Fuller

Inventor,
Burt D. Stevens
By Offield, Towle & Linthicum
Attys.

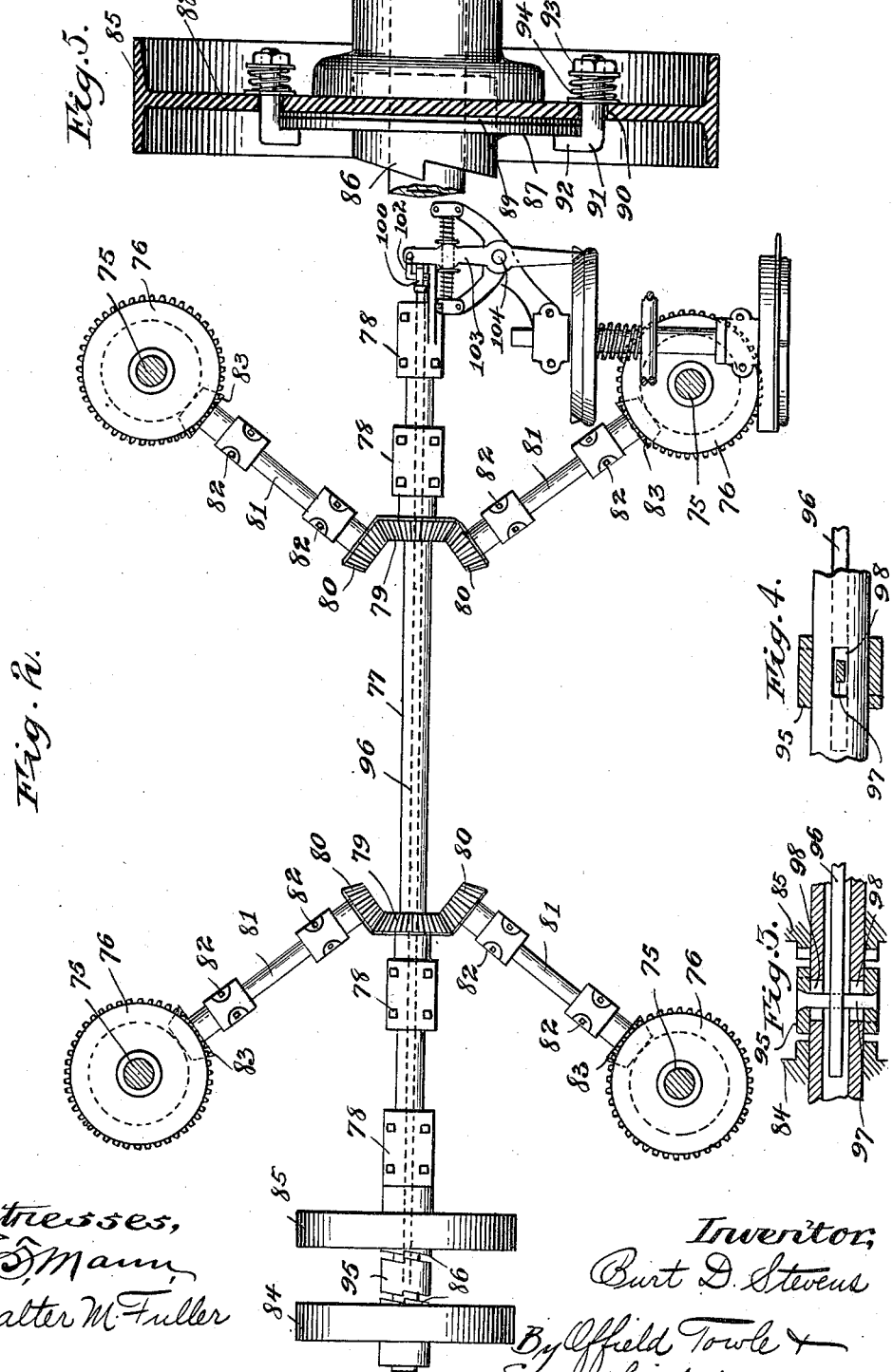

B. D. STEVENS.
ADJUSTING MEANS FOR SAWS.
APPLICATION FILED APR. 15, 1907.
1,001,783.
Patented Aug. 29, 1911.
5 SHEETS—SHEET 3.
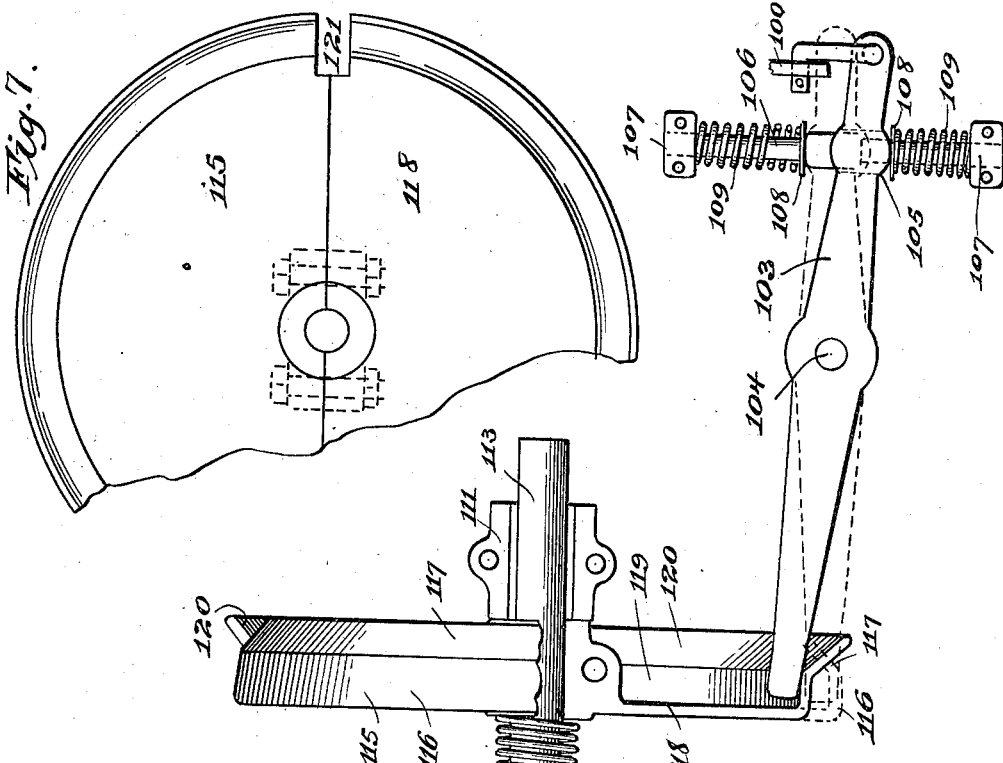
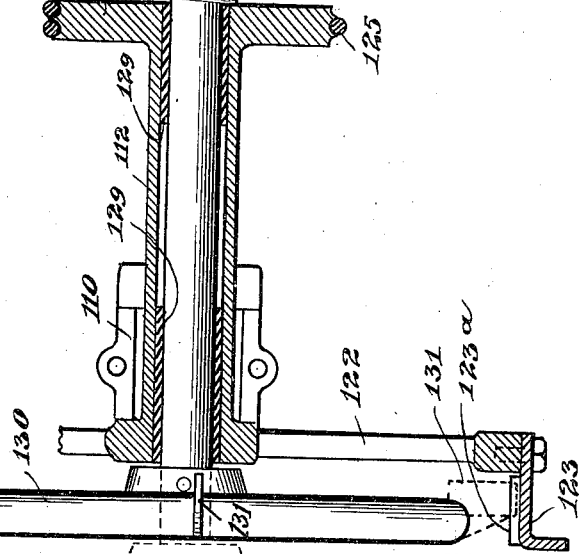

B. D. STEVENS.
ADJUSTING MEANS FOR SAWS.
APPLICATION FILED APR. 15, 1907.
1,001,783.
Patented Aug. 29, 1911.
5 SHEETS—SHEET 4.
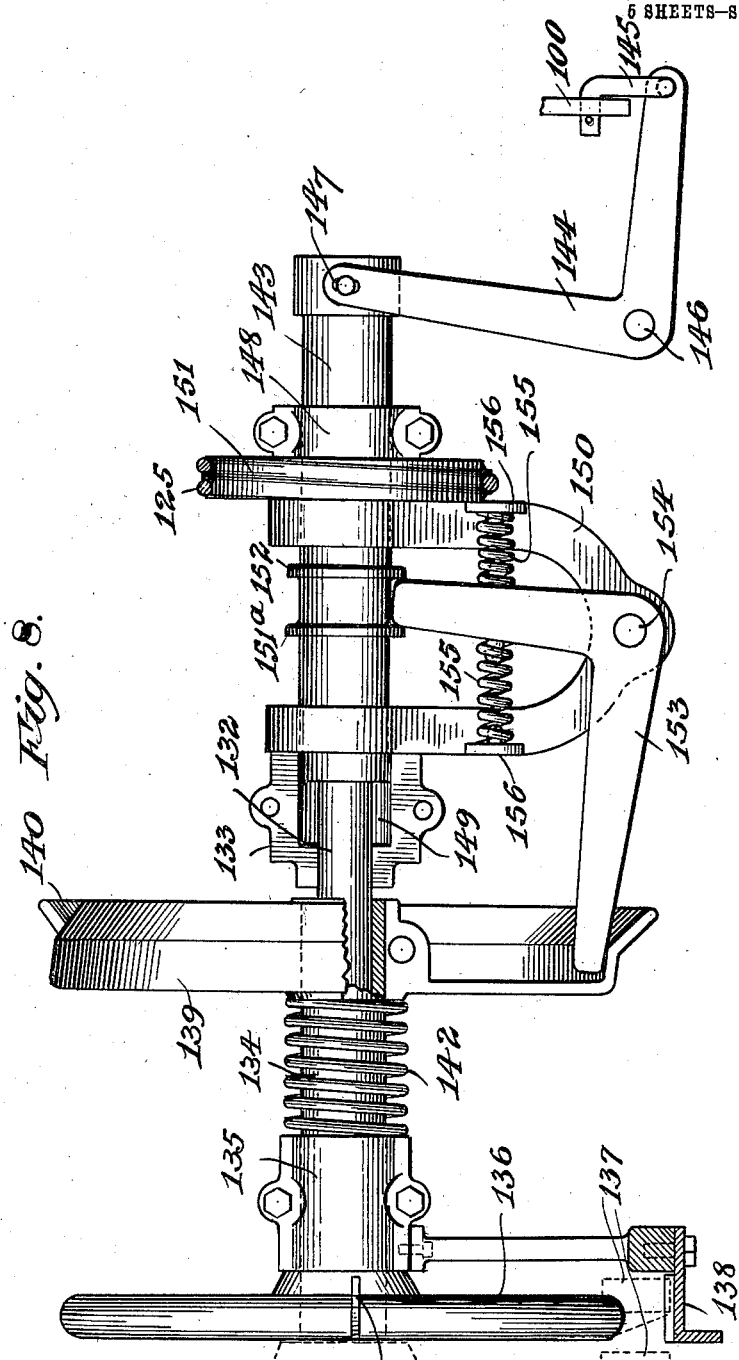

B. D. STEVENS.
ADJUSTING MEANS FOR SAWS.
APPLICATION FILED APR. 15, 1907.
1,001,783.
Patented Aug. 29, 1911.
5 SHEETS—SHEET 5.
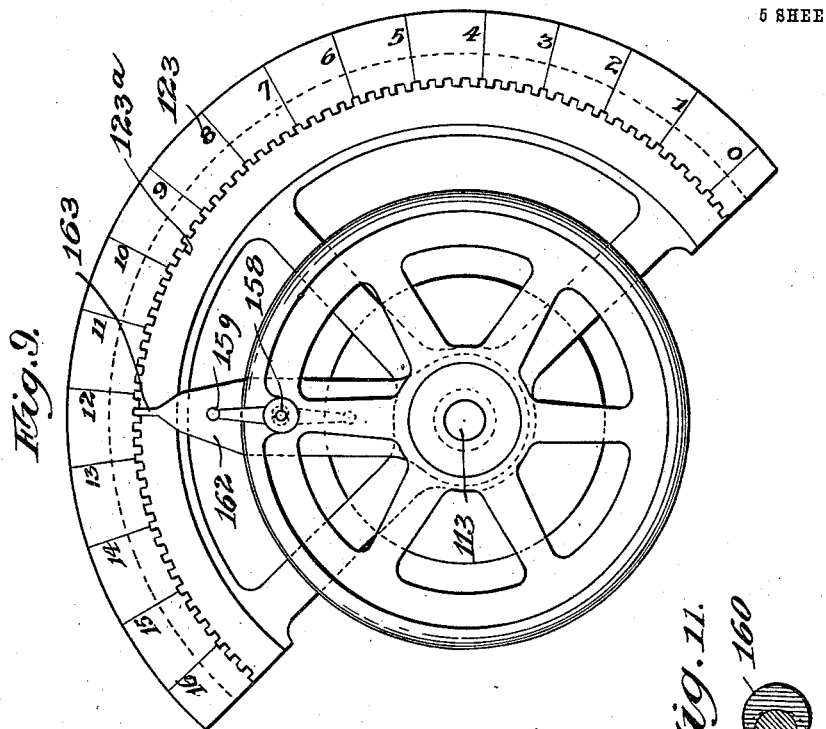
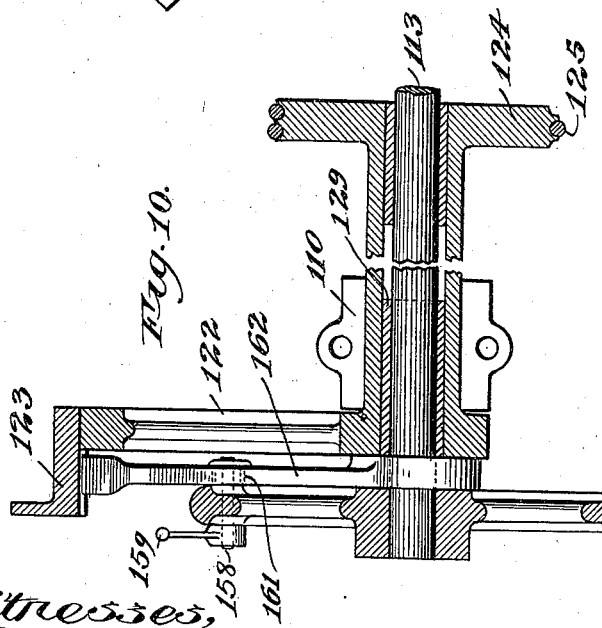
Witnesses,
Inventor,
Burt D. Stevens
By Offield Towle & Linthicum
Atty's.

UNITED STATES PATENT OFFICE.

BURT D. STEVENS, OF BELOIT, WISCONSIN, ASSIGNOR TO THE BERLIN MACHINE WORKS, OF BELOIT, WISCONSIN, A CORPORATION OF WISCONSIN.

ADJUSTING MEANS FOR SAWS.

1,001,783.

Specification of Letters Patent. Patented Aug. 29, 1911.

Application filed April 15, 1907. Serial No. 368,393.

*To all whom it may concern:*

Be it known that I, BURT D. STEVENS, a citizen of the United States, residing at Beloit, in the county of Rock and State of Wisconsin, have invented certain new and useful Improvements in Adjusting Means for Saws, of which the following is a specification.

My invention relates to means for adjusting or regulating the position of the saw of a saw mill, especially a band saw, and also concerns mechanism for changing the position of the feeding rollers for conveying the boards, logs, or the like to be cut.

The preferred embodiment of my invention has a horizontal band saw and two series of feed rollers side by side beneath it, the rollers of one longitudinal series being connected together, whereby they may be simultaneously and equally adjusted toward or from the saw blade to regulate the thickness of the board sawed. The other group or set of rollers has no means for simultaneous adjustment and they are not intended to be moved toward and from the saw to vary the thickness of the board, but rather the saw itself is moved to a greater or less distance from this set of comparatively fixed feed rolls. With a mechanism of this character two boards or logs may be sawed at the same time and the delivered boards may be of the same or different thicknesses. For example, the board fed in by the non-adjustable rolls may be four inches in thickness, and split or cut into two boards each two inches thick. These in turn may be returned to the front of the machine and being advanced by the adjustable rollers cut into two one-inch boards by the same saw and at the same time that the four-inch planks are being cut. The saw blade is first adjusted with reference to the non-adjustable rollers to deliver boards of the proper thickness, and then the other or adjustable rollers are moved simultaneously with reference to the saw blade to deliver boards of the same or different dimensions. Both adjusting devices are necessary to enable the machine to saw and discharge boards of the required and different thicknesses at the same time.

Many features of novelty will be found in the details of my construction and will be made apparent from the description below, taken in connection with the accompanying drawings, forming a part of this specification.

In the drawings, Figure 1 is a fragmentary elevation of the feeding-in end of a band saw equipped with my improved adjusting means; Fig. 2 is a plan view of the mechanism for raising and lowering the main frame of the machine, whereby adjustment of the position of the band saw is secured; Figs. 3 and 4 are fragmentary sections of the clutch mechanism; Fig. 5 is a vertical section of one of the clutch pulleys; Fig. 6 is a partial elevation and partial section of the clutch controlling device; Fig. 7 is a fragmentary face view of a part of the clutch controller; Fig. 8 illustrates a modified form of adjusting and clutch-controlling mechanism; and Figs. 9, 10 and 11 show a modification of the adjusting means.

The base of this band saw includes a pair of transverse I-beams 10, 10 and four pillars or base supports 11. Mounted and vertically adjustable on the four bases 11 is the main frame 12 of the saw, upon which are rotatably mounted a pair of band wheels 13 and 14 revoluble in bearings 15. Coöperating with these band saw wheels is the usual horizontal band saw 16.

The feed-roller construction of this saw-mill forms the subject matter of a copending application, Serial No. 411,777, filed January 20, 1908; consequently it will be unnecessary to incorporate in this application a detail description of this mechanism. Broadly considered, however, the feed roller mechanism comprises a series of supporting rollers 24 fixed relatively to the main frame of the machine and a series of rollers 36 mounted so as to be capable of simultaneous adjustment toward and from the saw. This vertical adjustment of the rollers is accomplished by means of an adjusting lever 49 and suitable connections between the lever and the rollers, as fully described in the above-mentioned copending application. Rotation is simultaneously imparted to both series of rollers to feed the material toward the saw by means of a train of driving gears adapted to mesh with a pinion 58 keyed to the driving shaft 57.

On the main frame 12 there is mounted a cross-shaft 68 adapted to be rotated from shaft 57 by a train of gears 69. Hinged on this shaft are two pairs of arms 70 between the free ends of which are mounted the upper rollers 71 which in effect constitute a single divided roller, and the surfaces of which are corrugated to facilitate the forward feeding of the boards. These rollers are rotated by means of sprocket chains 72 from the shaft 68. The weight of the rollers normally retain them on the tops of the boards being fed to the saws, but it will be evident that they may be swung upwardly about the shaft 68 to lift them from operative engagement with the boards.

The four legs of the main frame 12 rest upon four upright screws 75, each of which has a bevel gear nut 76 supported on the tops of the columns or pillars 11. By turning these gear nuts the main frame may be raised or lowered to adjust the position of the band saw 16 relative to the lower feeding rollers. It will be apparent that all four legs of the frame must be adjusted simultaneously and equally, and to accomplish this result I supply the machine with a hollow shaft 77 rotatable in suitable bearings 78. Two bevel gears 79 are connected to this shaft and mesh on their opposite sides with gears 80 of supplemental rotary shafts 81 extended toward the screws 75. Bearings 82 are provided for each of these shafts and at the outer end of each is a bevel pinion 83, the teeth of which mesh with the bevel gear nuts 76. By rotating the shaft 77 all of the nuts 76 will be turned equally at the same time whereby the proper raising or lowering of the main frame 12 is secured. Loose on one end of the shaft 77 I provide two pulleys 84 and 85 adapted to be driven in opposite directions by means of belts not shown. These pulleys have extended toward each other notched clutch hubs 86, Fig. 2, each integral with a disk 87, between which and the web 88 of the pulley is interposed a leather disk or washer 89. Each pulley web has a plurality of apertures 90 extended therethrough adjacent to the periphery of the circular disks 87 and 89, and through each of these apertures is extended a right angled finger or hook 91, the lateral portion 92 of which is adapted to engage and press against the outer face of disk 87. Between the other end of each member 91, upon which is threaded a nut 93, and the face of the pulley web 88 is interposed an expansion spring 94 which normally tends to hold the disk 87 and leather washer in tight frictional contact with the face of pulley web 88, whereby rotation of the pulley is transmitted to the clutch hub 86, but if for any reason the parts operated by the clutch hub are prevented from moving, the pulley can still turn without injuring the machine, the disks rubbing upon one another as is obvious.

Rotatable with and slidable upon the hollow shaft 77 is a toothed clutch collar 95 connected to a rod 96 extended through the hollow shaft 77 by means of a pin or rivet 97 passing through the rod through slots 98 in the shaft and fastened to the collar in any suitable manner. The other end of this rod projects beyond the end of shaft 77 and is pivotally connected at 99 to a vertical lever 100 whose fulcrum is at 101 on bracket 101ª. At its top end lever 100 is connected by means of a right angle link 102 to the end of an operating lever 103 pivoted on any suitable support at 104. This operating lever has an enlargement 105, through a transverse aperture of which passes a cross rod 106 fixed at its ends in sockets or supports 107. Slidable on this rod is a pair of collars or disk 108 engaging the opposite rounded sides of the enlargement 105, and between the collars 108 and supports 107 are interposed springs 109 encircling the rod. As will be readily understood, the function of these springs is to normally maintain the operating lever in a central or middle position whereby the clutch collar 95 is held out of engagement with either of the clutch hubs 86. The abutments or supports 107 as well as the bearings 110 and 111 of a sleeve 112 and internal shaft 113 are on a standard 114, rising from one of the base pillars or supports 11, whereby the clutch operating mechanism does not partake of the vertical movements of the main frame 12. Shaft 113 is rotatable and slidable in its bearing 111 and has clamped thereto adjacent to the bearing, which forms a stop, two semi-circular members comprising a controller for lever 103. One of these members, 115, has a semi-circular part 116 concentric to and substantially parallel to the axis of shaft 113, and on its edge, toward lever 103, it has an inwardly inclined flange or rim 117. The other member 118 has a corresponding part 119 concentric and parallel to the axis of shaft 113, but of less diameter than the part 116. It also has a marginal flange 120, which instead of inclining inwardly flares outwardly. The relation of parts 116, 117. 119 and 120 to each other has been indicated in full and dotted lines on the lower portion of Fig. 6. At the junction of the parts 115 and 118 the rims are cut away to provide a notch 121 adapted to normally receive an end of lever 103, the usual position of which is indicated in dotted lines on Fig. 8. The sleeve 112 is rotatable in bearing 110, and at its outer end is equipped with a series of arms 122, which at their ends carry a substantially semi-circular graduated scale 123, having on its inner curved face a series of teeth 123ª, and intervening notches corresponding to the scale graduations. At its other end, sleeve 112 has a grooved pulley 124, around which is adapted to pass a cord or cable 125, the two ends of which are fastened to the vertically adjustable main frame 12 at the points 126 and 127 (see Fig. 1). Between the pulley 124 and the lever controller 115, 118 is placed an expansion coil spring 128 which normally pushes the controller against the bearing 111. Within sleeve 112 I provide one or more bushings 129 in which shaft 113 may slide and rotate, the bushings forming bearings for the shaft. On the outer end of shaft 113 I fix a round handle 130 and equip the same with a knife-edge pointer 131 which coöperates with the graduations on the scale 123 to indicate the adjustment of frame 12 and the band saw which it carries and which may pass into and from the notches between teeth 123$^a$.

The operation of this clutch controlling mechanism is as follows: Assuming that the operator desires to raise or lower the frame 12 so as to adjust the position of the band saw relative to the lower feeding rollers, he grasps the handle 130 and pulls it out to the dotted line position indicated in Fig. 6, thereby sliding the shaft 113 in bearing 111 and bushings 129, and also removing pointer 131 from between the teeth of the scale. Owing to the fact that the controller 115, 118 is mounted on shaft 113 to move therewith it slides at the same time away from the end of lever 103 against the pressure exerted by spring 128, so that the end of lever 103 is freed from slot 121. This operation brings the parts into such condition that the controller 115, 118 may be rotated relative to lever 103, and this rotation is accomplished by turning the handle 130 and pointer 131 so that the proper adjustment is indicated by the pointer on the scale 123. This rotation of the parts brings the tapered part 117 or 120, according to the direction of rotation of the handle, into alinement with the end of the lever 103, and upon the release of handle 130, which the operator releases as soon as he turns it the proper amount, one or the other inclined surface, 117 or 120, strikes the end of lever 103 throwing the same to one side or the other as indicated in Fig. 6. The release of handle 130 causes the entry of pointer 131 into the notch between teeth 123$^a$ corresponding to the graduation of the adjustment required, thereby locking the handle and scale against independent rotation. This sliding return of the controller 115, 118 is accomplished by the expansion of spring 128, and when the controller has reached the stop bearing 111 the end of lever 103 will be on the inside of surface 119 or on the outside of surface 116 according to the direction of the previous rotation of handle 130 and shaft 113. The turning or swinging of lever 103 by the controller 115, 118 turns the lever 100 on its fulcrum 101 in one direction or the other, whereby the clutch rod 96 is shifted so as to throw the clutch collar 95 into engagement with one or the other clutch hubs 86. This engagement of the coöperating toothed members of the clutch causes the rotation of pulley 84 or 85 to be transmitted through the frictional contact members 88, 87, 89 and 91 to the hollow shaft 77, whereupon the pairs of gears 79 are rotated compelling revolution of the four shafts 81, gears 83 and gear nuts 76, so as to cause the elevation or descent of the main frame 12, saw, and upper feed rollers. Owing to the fact that the cord or cable 125 encircles the grooved pulley 124 and has its ends fastened to frame 12, the movement of the latter is transmitted through the cable to the pulley so as to cause a rotation of sleeve 112, semi-circular scale 123, handle 130, pointer or index 131, shaft 113 and controller 115, 118. Lever 103 is maintained displaced and held in operative position until the controller 115, 118 has revolved sufficiently to bring the notch 121 opposite the end of the lever, at which time the opposed springs 109 return the lever to a central or normal position, at the same time throwing the clutch collar 95 into inoperative position. The rotation of scale 123, because of the engagement of pointer 131 and teeth 123$^a$, returns the handle and pointer to normal position, the normal position of the pointer being directly above the axis of shaft 113 as shown in Fig. 1 and corresponding to that position of controller 115, 118 in which the end of lever 103 lies in notch 121, this position of the lever being that in which both clutches are thrown out of gear or rendered inoperative. It should be noted that the scale, handle, and pointer return to this position simultaneously and automatically, so that thereafter the pointer will indicate the adjustment of the main frame.

It will be readily understood that as soon as the clutch is thrown out of operation the movement of the main frame and the members operated thereby will cease, but this cessation will not occur until the handle, scale and controller have assumed their normal and usual positions. In other words, the movement of the main frame is transmitted to the interlocked handle and scale and they actuate the clutch controller to render the clutch inoperative when the main frame reaches the adjustment desired and which is indicated by the pointer and scale. This unclutching, however, always occurs at exactly the same instant that the pointer reaches its normal vertical position so that no further movement of the frame, handle, or scale takes place.

Attention is directed to the fact that while the handle is being turned manually to secure a new adjustment of the frame the scale is stationary, and it is not until the pointer has entered the proper notch of the scale that one of the clutches is set into operation and the movements of the frame, scale, and handle begin.

To operate this device so as to saw boards of different thicknesses, the saw 16 is adjusted in relation to the set of fixed rollers in the manner above indicated, and then the set of adjustable rollers is adjusted to the proper position to produce boards of the thickness desired. If a plank of extreme width is to be sawed the two sets of rollers may be adjusted so as to be in the same plane and the plank may be fed in by both sets of rollers. The upper power-driven feed rollers mounted on the main frame partake of its adjustment whereby their position is regulated at the same time that the main frame and saw are elevated or lowered, the advantage of which is obvious.

In Fig. 8 I have illustrated a modification of the clutch-controlling and adjusting mechanism in which the graduated scale is stationary and the device for controlling the clutch is varied and its operation substantially reversed. Rotatably mounted on a central shaft 132 revoluble and longitudinally-slidable in a bearing 133 is a sleeve 134 adapted to rotate in a bearing or box 135. A governing handle 136 with a pointer or index 137 is fixed to and rotatable with sleeve 134, and mounted upon the bearing 135 or other suitable stationary support is a graduated toothed scale 138, the graduations of which correspond to the adjustments of the saw. On the inner end of sleeve 134 and revoluble therewith I mount two substantially semi-circular members or cams 139 and 140 like the members 115 and 118 of Figs. 6 and 7, a slot corresponding to the opening 121 being provided into which the end of the operating lever may pass. A coil spring 142 interposed between the members 139 and 140 and the adjacent end of bearing 135 tends to yieldingly maintain the sleeve, handle, and cam-controller in their innermost positions. Slidably and rotatably mounted on the inner end portion of the internal shaft 132 I provide a second sleeve 143, the inner end of which is connected by a bell-crank 144 and a link 145 to the top end of lever 100. As is illustrated, the bell-crank is pivoted at 146 on any suitable support and has a loose connection at 147 with the sleeve. A bearing 148 is provided through the end of which sleeve 143 may slide. Owing to the cylindrical recess 149 in bearing 133 no obstruction or resistance is offered to the reciprocation of sleeve 143. Rotatable on this sleeve and disposed between the stationary or fixed bearings 133 and 148 is a U-shaped bracket or support 150, having fixed thereto or integral therewith a grooved pulley 151, encircled by the cord or cable 125 actuated by the main frame of the machine. Sleeve 143 is slidable through apertures in the legs of U-shaped bracket 150 and in the pulley 151, it being understood that the bracket and pulley are rotatable but not movable axially on shaft 132, being prevented from such movement by bearings 133 and 148. Between the legs of bracket 150, sleeve 143 has a pair of collars or circular flanges 151$^a$ and 152 spaced apart between which is disposed the end of a bell-crank lever 153 pivoted to the bracket at 154. This bell-crank lever corresponds to the lever 103 of Fig. 8 and its free end coöperates with the cam or controller members 139 and 140, as does the end of lever 103 with members 115 and 118. In order to return levers 153 and 100 and the other coöperating parts to normal clutch-inoperative position, I provide a pair of springs 155 pressing against the opposite sides of lever 153 and against abutments or stops 156 on bracket 150.

Assuming that lever 100 is in its central or clutch-inoperative position and that the end of lever 153 is in the notch between the cam or controller members 139 and 140, the operator in order to change the adjustment of the saw and main frame grasps handle 136 and pulls it out to the dotted line position shown in the figure against the action of spring 142. At the same time pointer or index 137 is slid out of one of the notches of scale 138 and members 139 and 140 move away from lever 153 so that the end of the latter leaves the notch or groove between the members. The handle is then rotated or turned until pointer 137 is opposite the graduation on the scale corresponding to the adjustment desired, members 139 and 140 turning with the handle. The handle is then released and due to the expansion of spring 142 pointer 137 enters the notch of the scale opposite the index of the adjustment required and members 139 and 140 slide toward the end of lever 153, the sloping or cam surface of one of them engaging the end of the lever and forcing it sidewise rocking the lever on its fulcrum 154. This shifting of lever 153 slides sleeve 143 in one direction or the other and moves parts 144, 145, and 100 to throw clutch collar 95 into engagement with one or the other clutch hub 86, thereby rendering one of the two clutches active. The main frame and its band saw ascend or descend as described above, and the movement of the main frame is transmitted through cable or cord 125 to pulley 151 and bracket 150 causing their rotation. These members and lever 153 revolve about shaft 132 and sleeve 143 until the end of lever 153 reaches the notch or open space between the adjacent ends of members 139 and 140. Then the end of lever 153 passes into the notch due to the action of one of the springs 155 and this turning of lever 153 about its fulcrum 154 slides sleeve 143, due to the other end of the lever being between collars 151ᵃ and 152, so that parts 144, 145, 100, etc. are shifted to throw the clutch out of operation, both clutches then being out of action. The main frame and saw cease moving, their adjustment at this time corresponding to that indicated by pointer 137 on scale 138. In this device the scale is stationary, lever 153 is revolved by the movement of the main frame 12, and the inclined or sloped controlling members 139 and 140 are locked stationary by the coöperating pointer and scale, while in the structure shown in Fig. 6 the scale is revolved by the movement of the main frame, the semi-circular controlling members rotate with the scale, and the lever 103 has no rotation about shaft 113.

It is desirable in some cases to secure a finer adjustment than that indicated by the scale, and it is especially desirable to vary from the scale indication by an amount equal to the width of a saw kerf, which may or may not equal one or more of the graduations of the scale. For example, suppose it is desired to saw 4 inch planks which are afterward to be cut into two 2 inch planks or boards. It is apparent, that, in order that the two 2 inch planks shall be exactly 2 inches in thickness, it will be necessary to make the thickness of the 4 inch plank an amount greater than 4 inches equal to the width of the saw kerf when the plank is cut into two 2 inch planks. I find that it is not always desirable to make the graduations on the scale so fine that they will indicate the width of saw kerfs, and in order to allow for the width of such kerfs, I provide a means whereby the handle and pointer may be offset or shifted relative to one another an amount corresponding to the width of one or more kerfs.

In Figs. 9, 10, and 11 I have illustrated my improved means for accomplishing the desired result in connection with the type of adjusting means shown in Fig. 8 wherein the scale revolves, but it is to be understood that this feature is equally applicable for use in the modification shown in Fig. 8. Fixed to shaft 113 at its outer end is a round or circular handle 157 having an aperture therethrough near its rim forming a bearing for a short shaft 158 equipped with a small handle 159 fixed thereto. Back of handle 157 this shaft 158 has an eccentric or cam portion 160 which fits in a slot 161 of a pointer or index 162 rotatably mounted on shaft 113 at the inner side of handle 157. At its upper end this pointer has a tongue 163 adapted to slide into and out of the notches of the scale 123. When handle 159 is extended outwardly radially from the axis of shaft 113, the relation of the handle and pointer are such that the graduations on the scale are correct, but if the handle 159 is turned to the dotted line position shown in Fig. 11, the handle and scale are shifted so that the adjustment of the band saw will not be that indicated on the scale by tongue 163, but will be greater than the indication an amount equal to the width of a saw kerf.

Although in this application I have described in detail my preferred constructions, it is to be understood that my invention is not limited to the specific features of construction and combination shown and described, but that various modifications may be made therein without departing from the substance of my invention or sacrificing any of its advantages. For example, instead of using a handle equipped with a pointer or index which forms part of the means to lock the handle and scale together, I may use a handle alone to act as index and as part of means to couple the scale to the handle.

In the appended claims I have used the term "two-part controller" and it is to be understood that one of said parts is composed of the two semi-circular sloped or inclined members which co-act with the spring-pressed clutch-controlling lever and that the other part is the lever itself.

The improvement herein described may in a broad sense be considered as a clutch controller, but in its operative relation to the other parts of the mechanism and in a useful sense such clutch controller is associated with a part which is to be moved by the clutch to a definite position, and which when it reaches its attained position automatically disconnects the clutch operating means and arrests the movement. Considered in this broad sense the hand wheel and the parts moved thereby and the spring operating therewith may be considered as a setting mechanism. The means for operating the clutch may comprise the controller 115, 118 or 139, 140 and the lever 103 or 153 with their springs, and the connections between said lever and the movable member of the clutch, and the connection between the part controlled by the clutch and the clutch operating means includes the cable 125 or its equivalent.

The indicator may be the scale bar or it may be rack or gear teeth or any other part with reference to which the setting mechanism is operated through definite distances so as to attain corresponding positions of the part controlled by the clutch.

I claim:

1. In a device of the character described, the combination of an adjustable member, a tool carried thereby, means for shifting said member and tool, a controller to render said shifting means operative or inoperative upon said adjustable member, a scale graduated to correspond to the various positions assumable by said tool, a handle connected to said controller, a pointer for said handle, said handle being movable to carry said pointer into engagement with said scale at any one of its graduations, said controller being actuable through the connection between said handle and controller to render said shifting means operative, and means to render said shifting means inoperative on said adjustable member when said tool reaches the adjustment indicated on the scale by said pointer, substantially as described.

2. In a device of the character described, the combination of an adjustable member, a tool carried thereby, means for shifting said member, a two-part controller to render said shifting means operative or inoperative upon said adjustable member and tool, a scale graduated to correspond to the various positions assumable by said tool, a handle connected to one of the parts of said controller, a pointer for said handle, said handle being movable to carry said pointer into engagement with said scale at any one of its graduations, said controller being actuable through the connection between the handle and controller part to render said shifting means operative without necessarily effecting movement of the other controller part, and means to render said shifting means inoperative when said tool reaches the adjustment indicated on said scale by said pointer, substantially as described.

3. In a device of the character described, the combination of an adjustable member, a tool carried thereby, means for shifting said member, a two-part controller to render said shifting means operative or inoperative upon said adjustable member and tool, a scale graduated to correspond to the various positions assumable by said tool, a handle connected to one of the parts of said controller, a pointer for said handle, said handle being movable to carry said pointer into engagement with said scale at any one of its graduations, said controller being actuable through the connections between the handle and controller part to render said shifting means operative, and means to move one of the parts of said controller simultaneously with the adjusting movement of said adjustable member and tool whereby the parts of said controller assume a relation which renders said shifting means inoperative when said tool reaches the adjustment indicated on the scale by said pointer, substantially as described.

4. In a device of the character described, the combination of an adjustable member, a tool carried thereby, means for shifting said member and tool, a two-part controller to render said shifting means operative or inoperative upon said adjustable member and tool, a scale graduated to correspond to the various positions assumable by said tool, a rotatable handle connected to one of the parts of said controller, a pointer for said handle, said handle being movable to carry said pointer into engagement with said scale at any one of its graduations, said controller being actuable through the connection between the handle and controller part to render said shifting means operative, and means to rotate one part of said controller simultaneously with the movement of said adjustable member to bring the two parts of said controller into such relation that said shifting means becomes inoperative when said tool reaches the adjustment indicated on the scale by said pointer, substantially as described.

5. In a device of the character described, the combination of an adjustable member, a tool carried thereby, means for shifting said member and tool, a two-part controller adapted to render said shifting means operative or inoperative upon said adjustable member, one of the parts of said controller having a sliding and rotary movement, a scale graduated to correspond to the various positions assumable by said tool, a slidable rotatable handle connected to and movable with said part of said controller, said handle being equipped with a pointer and movable with said part to carry said pointer into engagement with said scale at any one of its graduations, said handle being actuable through said controller to render said shifting means operative on said adjustable member, and means to rotate one of the parts of said controller simultaneously with the movement of said adjustable member to bring the two parts thereof into such relation as to render said shifting means inoperative on said adjustable member when the tool reaches the adjustment indicated by the pointer on the scale, substantially as described.

6. In a device of the character described, the combination of an adjustable member, a tool carried thereby, means for shifting said member, a two-part controller adapted to render said shifting means operative or inoperative upon said adjustable member, one of the parts of said controller having a sliding and rotary movement, a scale graduated to correspond to the various positions assumable by said tool, a slidable rotatable handle connected to and movable with said part of said controller, said handle being equipped with a pointer and movable with said part to carry said pointer into engagement with said scale at any one of its graduations, said handle being actuable through said controller to render said shifting means operative on said adjustable member, means to lock said handle to said scale, and means to rotate one of the parts of said controller and said scale simultaneously with the movement of said adjustable member to bring the two parts of the controller into such relation as to render said shifting means inoperative on the adjustable member when said tool reaches the adjustment indicated by said pointer on the scale, substantially as described.

7. In a device of the character described, the combination of an adjustable member, a tool carried thereby, means to shift said member, a movable handle equipped with a pointer for controlling the operation of said shifting means, means connecting said handle and shifting means, whereby said shifting means may be thrown into operation by movement of said handle, a movable scale adjacent to said pointer and graduated to correspond to the various positions assumable by said tool, means actuated by said adjustable member to move said scale, whereby the graduation thereof at the normal position of said pointer will always indicate the adjustment of said tool, means permitting said handle to move relatively to said scale and permitting the scale to move the handle when the former is actuated by the adjustable member to bring them to the normal position of the handle and pointer, substantially as described.

8. In a device of the character described, the combination of an adjustable member, a tool carried thereby, means for shifting said member, a rotatable handle equipped with a pointer for controlling said shifting means, means connecting said handle and shifting means, whereby said shifting means may be thrown into operation by movement of said handle, a rotary scale adjacent to said pointer and graduated to correspond to the various positions assumable by said tool, a pulley rotatable with said scale, a cord fastened to said member and encircling said pulley, whereby the movement of said member causes rotation of said pulley and scale and the graduation of said scale at the normal position of said pointer will always indicate the adjustment of said tool, means connecting said handle and scale permitting the former to move relatively to the latter and permitting the scale to move the handle when the scale is actuated by the adjustable member to bring them to the normal position of handle and pointer, substantially as described.

9. In a device of the character described, the combination of an adjustable member, means for shifting said member, a clutch controlling the actuation of said shifting means, a two-part controller governing the operation of said clutch, the first part of said controller comprising a lever, the second part of said controller being adapted to temporarily maintain said lever in operative position, a handle connected to and adapted to operate said second part of said controller, whereby movement of said handle may render said shifting means operative, and means actuated by said adjustable member to move the second part of said controller to such position that said lever assumes its inoperative position and said clutch is released, substantially as described.

10. In a device of the character described, the combination of a clutch, a lever to control the operation of said clutch, a controlling member adapted to co-act with an end of said lever, said controlling member having a sliding and a rotary movement, said controlling member having an inclined portion adapted to engage the end of said lever and turn the same on its fulcrum into operative position when said controlling member is slid toward the end of said lever, said controlling member also having a portion adapted to hold said lever in its operative position after it has been shifted by said inclined portion, and means to slide and rotate said controlling member, substantially as described.

11. In a device of the character described, the combination of a pair of clutches, a lever controlling the operation of said clutches, means to normally hold said lever in inoperative position, a sliding rotary controlling member adapted to co-act with an end of said lever, said controlling member having one portion with an outwardly flaring flange and another portion with an inwardly inclined flange, said portions being adapted to co-act with said lever and separated by a slot in which the end of said lever rests when in inoperative position, and means to slide and rotate said controlling member, substantially as described.

12. In a device of the character described, the combination of an adjustable member, a tool carried thereby, means to adjust said member including a clutch, a clutch-controlling lever, a sliding rotary controlling member adapted to co-act with an end of said lever to turn the lever on its fulcrum to temporarily maintain it in operative position, a movable handle equipped with a pointer adapted to slide and rotate said controlling member, a movable scale adjacent to said pointer and graduated to correspond to the various positions assumable by said tool, means to move said scale whereby the graduations thereon at the normal position of said pointer will always indicate the adjustment of said tool, and means connecting said handle and controlling member to said scale permitting the handle and controlling member to move relatively to said scale and permitting the scale to move the handle and controlling member to bring the handle, pointer, and controlling member to normal position whereby said clutch is released, substantially as described.

13. In a device of the character described, the combination of an adjustable member, a tool carried by said member, means to adjust said member and tool, a scale graduated to correspond to the various positions assumable by said tool, a shaft, a handle mounted on said shaft adapted to control the actuation of said adjusting means, an apertured pointer loosely mounted on said shaft, a second shaft having a bearing in said handle and provided with an eccentric portion in the aperture of said pointer, and a second handle to turn said second shaft, whereby to shift the position of said pointer relative to said first handle, substantially as described.

BURT D. STEVENS.

Witnesses:
FREDERICK C. GOODWIN,
WALTER M. FULLER.

Copies of this patent may be obtained for five cents each, by addressing the "Commissioner of Patents, Washington, D. C."